June 26, 1928.

C. B. SPASE 1,675,063

CLUTCH CONSTRUCTION

Filed Jan. 5, 192

INVENTOR.
Charles B. Spase
BY
Parsons & Bodell
ATTORNEYS.

Patented June 26, 1928.

1,675,063

UNITED STATES PATENT OFFICE.

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK.

CLUTCH CONSTRUCTION.

Application filed January 5, 1926. Serial No. 79,484.

This invention relates to clutch construction and has for its object particularly simple, efficient and economical construction and means of securing disks or plates to a hub, so that the disks or plates are practically an integral part of the hub, and there is no point at which looseness can develop as when such disks or plates are secured to the hub by rivets, screws or other similar fastening means.

The invention consists in the novel features and in the combinations and construction hereinafter set forth and claimed.

In describing this invention reference is had to the accompanying drawings.

This clutch construction comprises, generally a clutch member as a plate or pressure ring, the plate portion of which is carried by a hub rotatable with the clutch shaft, the hub being formed with a noncircular collar portion and the plate having a similar noncircular opening fitting the noncircular portion of the hub. The hub also has annular collar portions on opposite sides of the plate, the collar portions and plate being integrally secured together as by welding.

1 designates the plate or pressure member of a single plate clutch.

Figure 1:
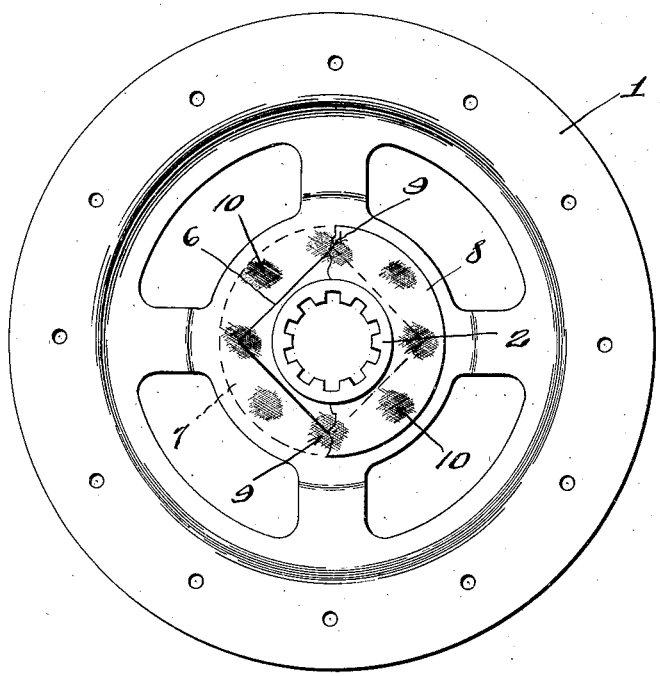
Figure 1 is a face view, partly broken away, of the plate of a single plate clutch embodying my invention.
Figure 2:
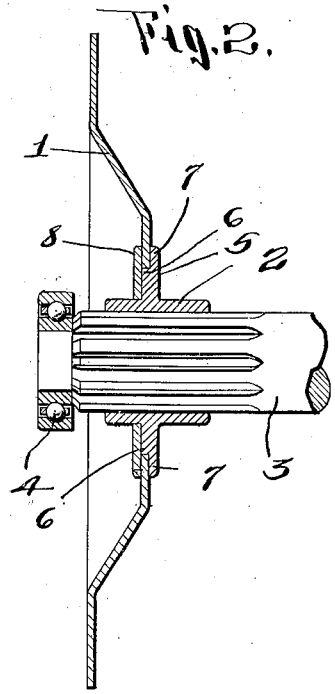
Figure 2 is a sectional view taken centrally of Figure 1, the clutch shaft and the pilot bearing, therefor being also shown.

2 is the hub which is usually slidably mounted on the clutch shaft 3 and is usually splined thereto. The shaft 3 generally has a pilot bearing 4 in the driving shaft or fly wheel of the engine of the vehicle provided with this clutch. The hub 2 is preferably formed with an annular collar portion 5, formed with a noncircular collar portion or boss 6 on one side thereof leaving the margin 7 of the portion 5 projecting beyond the boss. The boss 6 is shown in Figure 1 as square.

The plate is formed with a central square opening fitting the boss 6, so that the inner margin of the plate abuts against the margin 7 of the portion 5.

8 is a collar on the hub and abutting against the end face of the boss 6 and the inner margin of the plate 1. These parts are integrally secured together preferably by spot welding as at 9 at the corners of the boss and at 10 midway between the corners, the spots 10 being outside of the boss 6.

Figure 3:
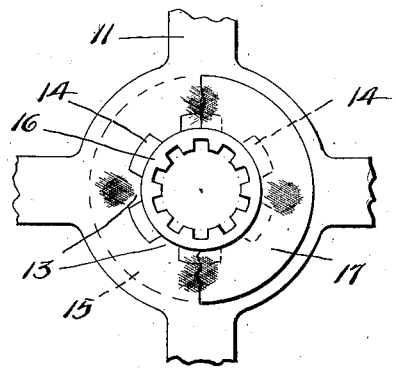
Figure 3 is a fragmentary view similar to Figure 1 of another form of this invention.
Figure 4:
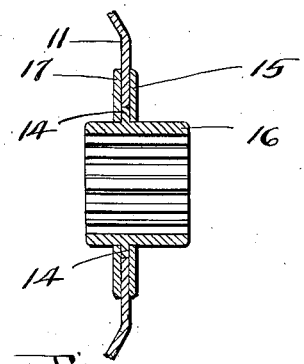
Figure 4 is a vertical sectional view taken centrally of Figure 3.

In Figures 3 and 4 the plate 11 is shown as formed with internal teeth 13 which fit a complemental toothed collar 14 and collars 15 and 17 separable from the hub abuts against opposite sides of the toothed collar 14 and inner margin of the plate 11. In the construction shown in Figures 3 and 4 the collar 15 is not integral with the hub, but is separable therefrom and is similar to the collar 17. In other words the inner margin of the plate 11 fits projecting teeth on the hub 16 and is secured thereto from endwise displacement by rings or washers 15 and 17 abutting against such teeth and the inner margin of the plate. The toothed collar 14 and rings 15 and 17, and interposed plate 11 are integrally secured together as by spot welding.

This clutch construction is not only more simple and economical than the single construction heretofore used, but also is more efficient as the plate is integrally secured to the hub and looseness cannot develop.

What I claim is:—

A clutch member comprising a hub having a noncircular collar portion and a metal plate having a non-circular opening fitting the non-circular collar portion, the hub also having annular flanges on opposite sides of said plate and integrally secured to the plate.

In testimony whereof, I have hereunto signed my name, at Syracuse, in the county of Onondaga, in the State of New York, this 29th day of Dec., 1925.

CHARLES B. SPASE.